United States Patent [19]

Deyesso

[11] Patent Number: 5,687,089
[45] Date of Patent: Nov. 11, 1997

[54] DRIVE REGULATOR CIRCUIT BOARD FOR A 3.50 INCH DISK DRIVE

[75] Inventor: Joseph P. Deyesso, Walpole, Mass.

[73] Assignee: Data General Corporation, Westboro, Mass.

[21] Appl. No.: 73,069

[22] Filed: Sep. 24, 1992

[51] Int. Cl.[6] .................................................. G06F 19/00
[52] U.S. Cl. ........................ 364/492; 304/483; 395/750
[58] Field of Search ..................................... 364/483, 492, 364/DIG. 1, 236.2, 238.3, 238.4; 395/425, 750

[56] References Cited

U.S. PATENT DOCUMENTS

| | | | |
|---|---|---|---|
| 3,792,447 | 2/1974 | Beltz et al. | 340/172.5 |
| 4,058,759 | 11/1977 | Halfhill | 322/13 |
| 4,298,939 | 11/1981 | Fluegel | 364/492 |
| 4,689,698 | 8/1987 | Ishikawa et al. | 360/69 |
| 4,860,185 | 8/1989 | Brewer et al. | 363/41 |
| 4,989,205 | 1/1991 | Dunphy, Jr. et al. | 371/10.1 |
| 5,121,500 | 6/1992 | Arlington et al. | 395/750 |
| 5,210,855 | 5/1993 | Bartol | 364/900 |
| 5,237,692 | 8/1993 | Raasch et al. | 395/750 |
| 5,278,730 | 1/1994 | Kikinis | 361/686 |
| 5,301,334 | 4/1994 | Horiuchi | 395/750 |
| 5,371,743 | 12/1994 | DeYesso et al. | 371/8.1 |

*Primary Examiner*—Emanuel T. Voeltz
*Assistant Examiner*—Kyle J. Choi
*Attorney, Agent, or Firm*—Kriegsman & Kriegsman

[57] ABSTRACT

A drive regulator circuit board for use with a 3.50 inch disk drive unit. The drive regulator circuit board includes a regulator section for receiving +24 volts distributed power and providing therefrom regulated +5V and +12V DC power, a monitor circuit for monitoring the +5V DC and +12V DC so generated, a SCSI bus reset pulser circuit for generating a SCSI bus reset pulse upon insertion or removal of the drive module, PALS for comparing the local address with an incoming address, control and for turning the DC voltages on or off in response to certain prearranged commands as well as providing SCSI bus activity indication, and a bus for providing SCSI ID information to said 3.50 inch disk drive unit.

1 Claim, 4 Drawing Sheets

DRIVE REGULATOR CIRCUIT BOARD FOR A 3.50 INCH DISK DRIVE

BACKGROUND OF THE INVENTION

The present invention relates generally to a drive regulator circuit board and, more particularly, to a drive regulator circuit board for a 3.50 inch disk drive.

Generally speaking, central processing units (CPU's) in data processing systems are capable of processing data much more quickly than mass storage devices are capable of delivering data. Consequently, a CPU often loses time, standing idle, while waiting for needed data to be transferred thereto from a mass storage device. As can readily be appreciated, this inefficiency frequently results in a waste of the tremendous horsepower of the CPU, which does not achieve maximum performance.

In the past, approaches utilizing disk caches and data base segmenting were developed to minimize this problem. However, none of these approaches met all of the requirements of a high-transaction processing environment.

Recently, subsystems comprising disk arrays, i.e., groups of small, independent disk drive modules used to store large quantities of data, have been developed and found to possess many advantages over a single large disk drive. For example, the individual modules of a disk array typically take up very little space and typically use less power and cost less than a single large disk drive, yet, when grouped together in an array, provide the same data storage capacity as a single large disk drive. In addition, the small disks of an array retrieve data more quickly than does a single large disk drive because, with a small disk drive, there is less distance for the actuator to travel and less data per individual disk to search through. The greatest advantage to small disk drives, however, is the boost they give to I/O performance when configured as a disk array subsystem. The disk drive modules in these arrays typically include a disk drive and a drive regulator circuit board. The drive regulator circuit board provides regulated power to the disk drive and certain other functions associated with the operation of the disk drive.

In a disk array configuration, multiple drives process concurrent data retrieval/storage requests. Supported by a software "device driver" and individual controllers, the disks operate simultaneously. While one disk drive is retrieving/storing data, another can be sending data to the CPU. With several disks performing overlapped seeks, data can be retrieved and delivered more rapidly to the CPU. The CPU spends less time idle, so overall system performance improves substantially.

Examples of known disk array subsystems are the Data General Corp. High Availability Disk Array (H.A.D.A.) subsystem and the Data General Corp. Combined Storage Subsystem 2 (CSS2) subsystem. Both of these disk array subsystems use 5.25 inch disk drives.

It would be desirable to provide a disk array subsystem which utilizes 3.50 inch disk drives as opposed to 5.25 inch disk drives. As can be appreciated, in order to use 3.50 inch disk drives it is advantageous to provide a drive regulator circuit board designed especially for use with this size drive.

Accordingly, it is an object of the present invention to provide a new and novel drive regulator circuit board.

It is another object of the present invention to provide a drive regulator circuit board for use with a 3.50 disk drive that offers the capability to remove or insert the disk drive module while under power or 'HOT REPAIR'.

SUMMARY OF THE INVENTION

A drive regulator circuit board constructed according to this invention for use with a 3.50 inch disk drive, the 3.50 inch disk drive being one of an array of disk drives includes means for receiving a distributed +24 volts and providing therefrom regulated power, +5V and +12 VDC, to the 3.50 inch disk drive unit, means for monitoring the +5V and +12V DC so generated, means for generating a SCSI bus rest pulse upon insertion or removal of the drive module, and means for controlling the on/off state of the drive module power in response to certain prearranged commands and outputting signals to provide visual indication of activity in the disk drive and means for providing SCSI ID information to said 3.50 inch disk drive unit relative to its location in the array without presetting each individual disk drive for a particular SCSI ID.

Various other objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF THE DRIVE REGULATOR CIRCUIT BOARD OF THIS INVENTION

Figure 1:
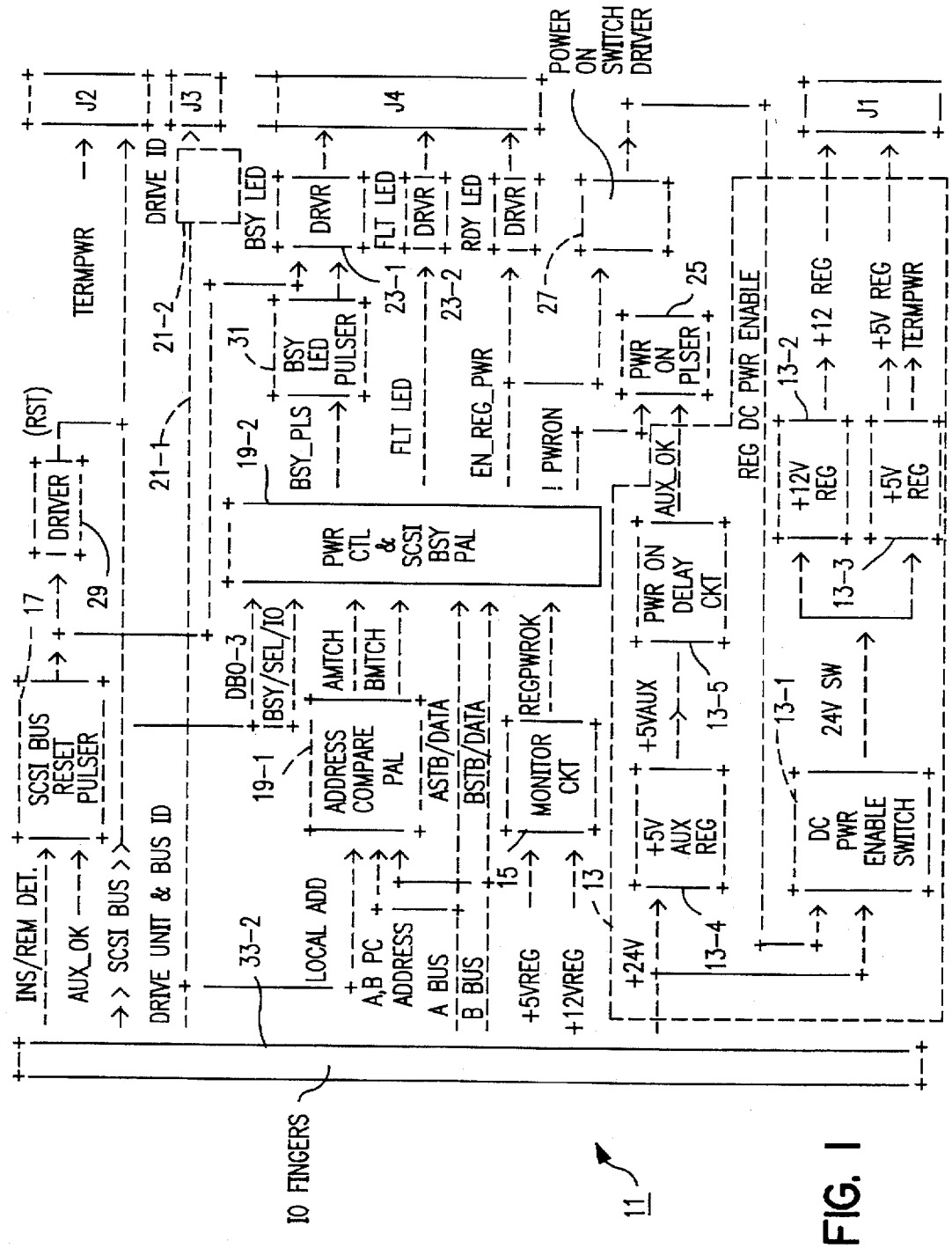
FIG. 1 is a functional block diagram of a drive regulator circuit board constructed according to this invention for use with a 3.50 inch disk drive.

Referring now to FIG. 1, there is shown a functional block diagram of a drive regulator circuit board according to this invention, the drive regulator board being identified by reference numeral 11. Drive regulator circuit board 11 is for use with a 3.50 inch disk drive (not shown) which is one of an array of disk drive modules. The array is intended to be controlled by up to two controllers (also not shown).

Drive regulator board 11 include a regulator section 13, a monitor circuit 15, a SCSI bus reset pulses 17, an address compare PAL 19-1 and a power control and SCSI BSY PAL 19-2, an ID bus 21-1 and associated driver 21-2, a plurality of LED drivers 23-1, 23-2 and 23-3, a power on pulser 25, a power on switch driver 27, a driver 29, a busy LED pulser 31, a printed circuit board 33-1 having set of I/O fingers 33-2 and four connectors labelled J1, J2, J3, and J4.

Regulator section 13 receives +24V through pins (not identified) on fingers 33-2 and outputs +5V DC reg, +12 VDC reg, a SCSI bus terminator voltage TERMS PWR and AUX OK. Regulator section 13 includes a DC power enable switch 13-1, a +12 V regulator 13-2, a +5V regulator 13-3, a +5 AUX regulator 13-4 and a power on delay circuit 13-5.

Monitor circuit 15 monitors the voltages generated by regulator section 13. SCSI bus reset pulser 17 generates a SCSI bus reset on power up, or when board 11 is inserted into the backplane in the drive module, or when any other disk drive which may be on the same SCSI bus is inserted or removed. Address compare PAL 19-1 compares the local address of the module containing board 11 with an incoming address. Power control and SCSI busy PAL 19-2 turn the DC voltages on or off in response to commands from external SCSI target controllers (not shown). Driver 21-2 provides unique SCSI ID information to the disk drive being powered by the regulator section at the particular disk module position. Drivers 23 provide signals to a front panel display (not shown) on the module housing to indicate a ready status, fault status, and SCSI activity for each disk module in the array.

Connector J2 interfaces directly to the drive module resident disk drive (not shown). Connector J1 provides DC power to the drive module resident disk drive. Connector J3 interfaces to the disk drive for the drive ID signals and the drive spindle reference sync signals. Connector J4 provides a signal interface to READY, FAULT and BUSY LED's on the front panel (not shown) of the disk drive module.

Figure 2:
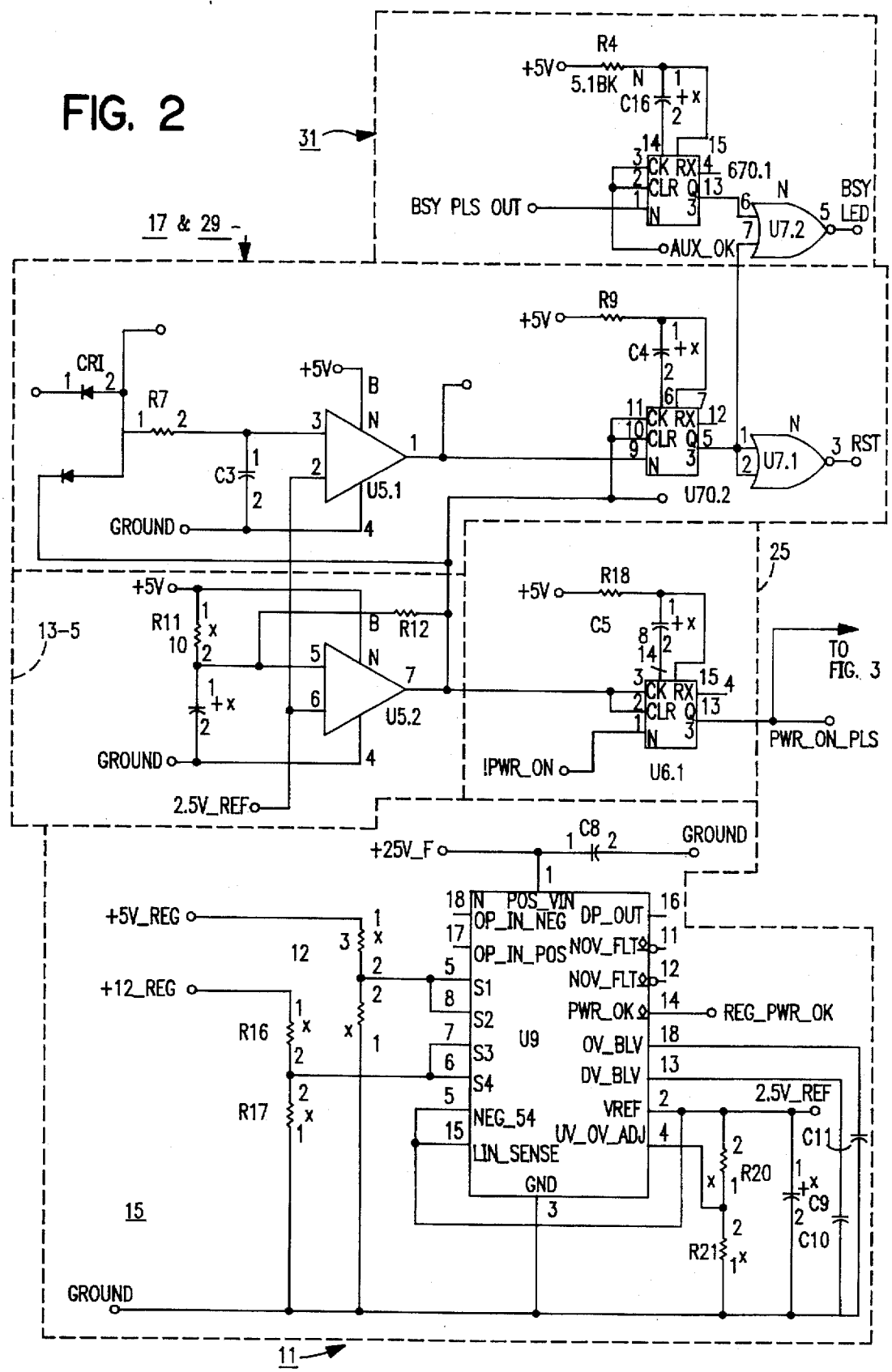
FIG. 2 is a schematic diagram showing the details of one portion of an actual implementation of the functional block diagram shown in FIG. 2.
Figure 3:
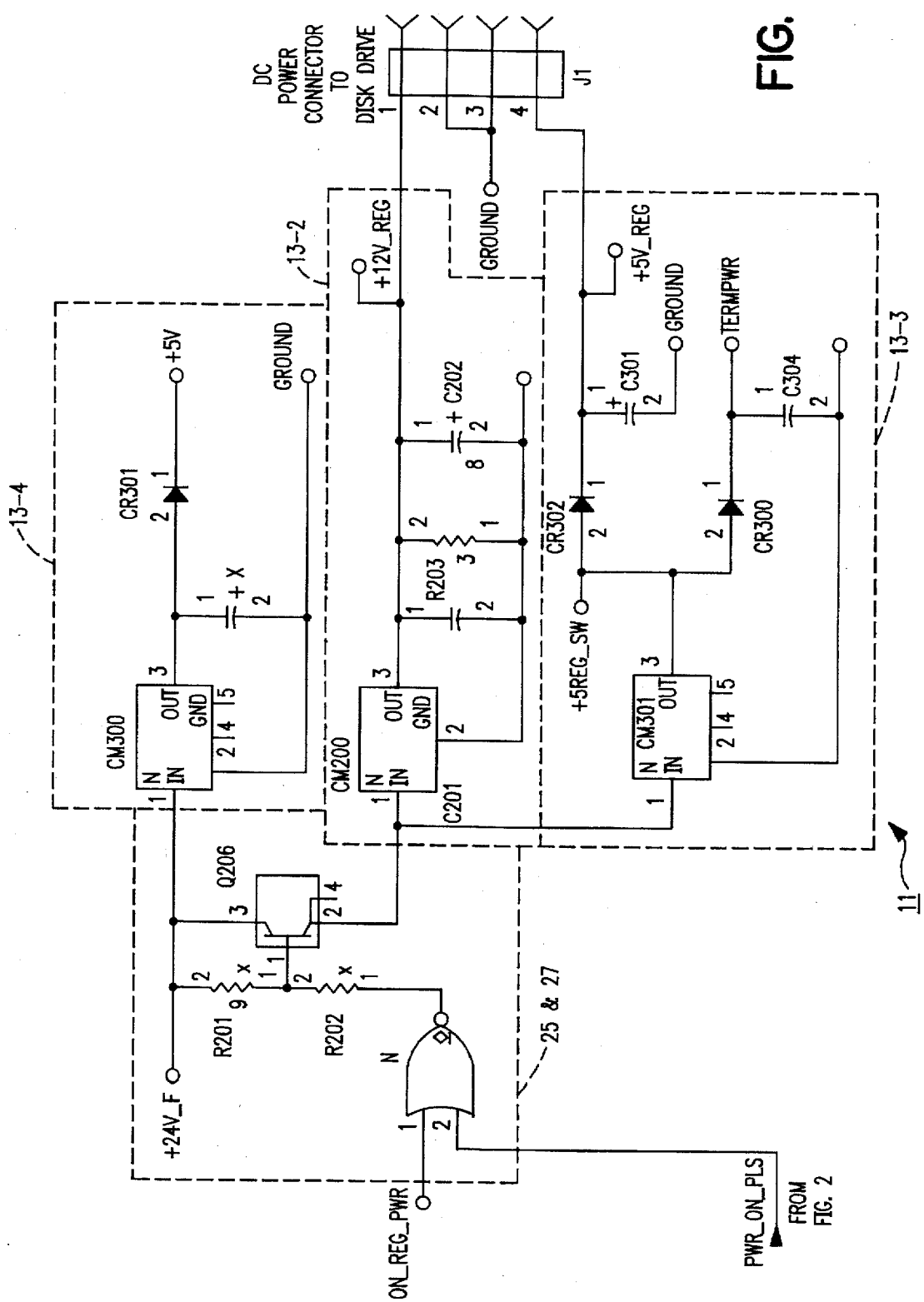
FIG. 3 is a schematic diagram showing the details of another portion of an actual implementation of the functional block diagram shown in FIG. 2.
Figure 4:
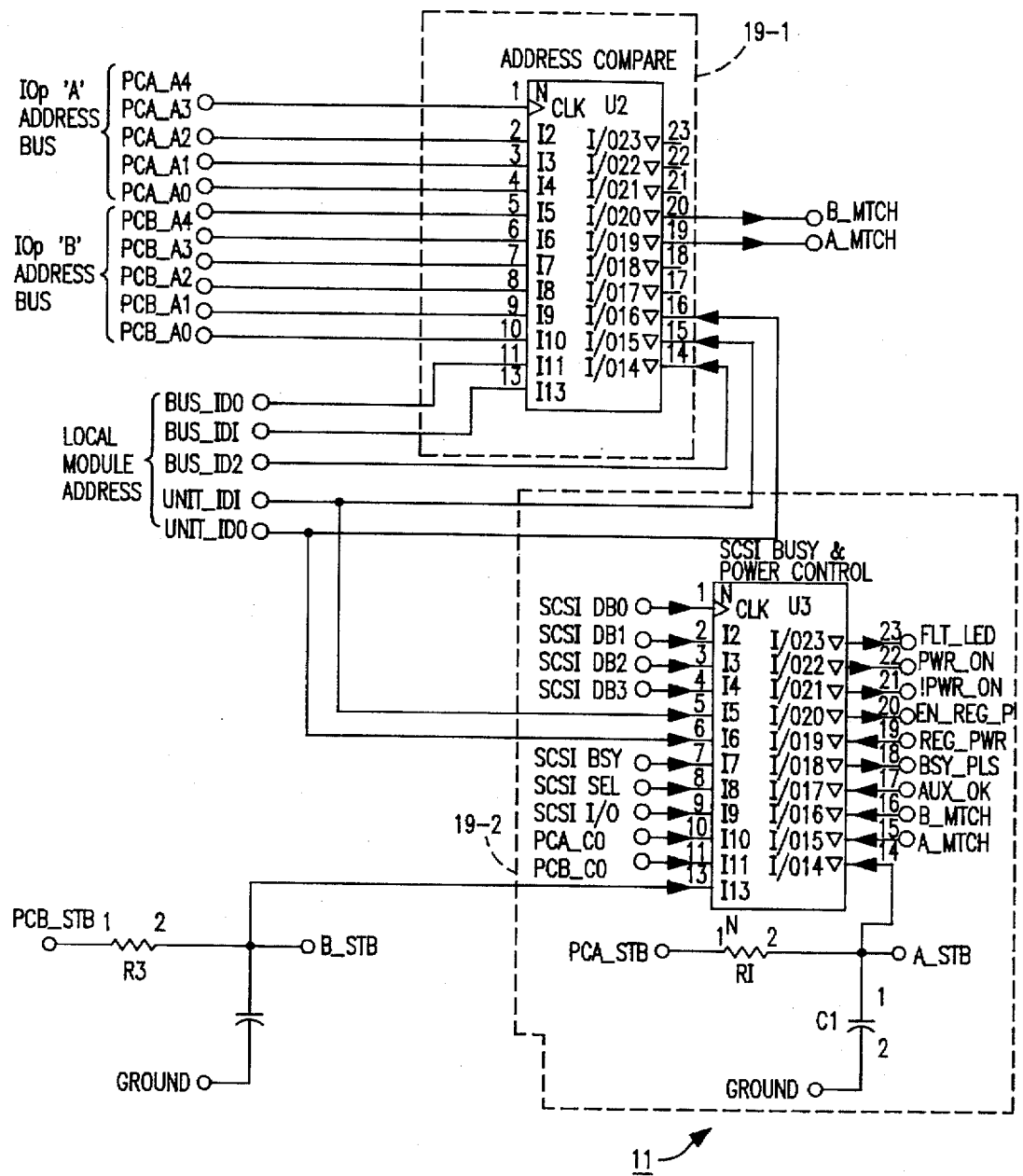
FIG. 4 is a schematic diagram showing the details of another portion of an actual implementation of the functional block diagram shown in FIG. 2.

Referring now to FIG. 2, there is shown a schematic diagram of an actual implementation of the circuitry in the block diagram shown in FIG. 1.

+5V AUX regulator circuit 13-4 comprises an integrated PWM 5V regulator module CM 300 (made by Power Trends of Batavia Ill.), a capacitor CR 300 and a diode CR 301. +5V regulator circuit comprises a module CR 301, identical to module CM 300, a pair of diodes CR 300 and CR 302 and a pair of capacitors C 301 and C 304. +12V regulator circuit includes a 12V regulator module CM 200 and associated circuitry 31. Module CM 200 differs from module CM 300 only in that it is for +12 V rather than +5V.

DC power enable switch 13-1 and driver 27 comprise circuitry including a 75454 open collector NOR gate U10.1, a TIP 126 Q200 and a pair of resistors R 201 and R 202.

BSY LED pulser 51 and driver 23-1 comprise circuity including a 74LS123 pulser U70.1, a 75454 open collector NOR gate U7.2, a resistor R4 and a capacitor C16.

SCSI bus reset pulser 17 and driver 29 comprise circuitry including an LM 393 dual comparator U5.1, a 74LS123 pulser U70.2, a 75454 open collector NOR gate U7.1, diodes CR1 and CR 900 resistor R7 and R8 and capacitors C3 and C4.

Power on pulser 25 includes a 74LS123 pulser U6.1, a resistor R10 and a capacitor C5.

Power on delay circuit 33-5 comprises an LM393M dual comparator U5.2, resistors R11 and R12 and capacitor C6.

Monitor circuit 15 includes a Unitrode UC 3903 power supply supervisory circuit, resistors R14 through R17, R20, R21 and capacitors C8 through C11.

Address compare PAL 19-1 and power control and SCSI busy PAL 19-2 are each 22V10 PALS.

Compare PAL, 19-1 compares the local address of the module with the incoming addresses on both the A bus and the B bus from the dual IOP controllers. PAL 19-1 implements a dual 5 bit compare of the busses with the local address of the disk drive module and outputs 2 signals, A_MTCH and B_MTCH, when the corresponding addresses match. These signals are fed to the Power Control and BSY pal 19-2 in conjunction with the command lines A_CO and B_CO, and the strobe signals, A_STB and B_STB, for further signal processing.

Power control and busy pal 19-2 performs two distinct functions. The first function involves providing signals indicating SCSI bus activity in the module and the second function involves controlling the dc power and monitoring the regulators on the board. Regarding the first function, PAL 19-2 detects a match between the Drive Module ID and the host adapter's successful selection of the Drive Module's disk drive's SCSI interface. The duration of the pulse produced is from the initiator's release of BSY to the target's assertion of BSY during the selection phase. The pulse can vary from 750 ns to 1.2 uscc. The BSY PULSE OUT signal is fed to a one shot pulser that stretches the pulse to 10MS so the human eye can detect device bus activity via the modules front panel led. As the activity on a particular drive increases, the drive module's led will glow nearly continuous at about 50 accesses per second. The BSY led (not shown) will also flash whenever any power control activity takes place via the A and B stobe signals also. Regarding the second function, the A & B address compare match outputs from PAL 19-1 and the command bit CO for each power control bus are used to set and reset a latch to control the power on/off state of the regulator, timed by the A,B strobe signals.

Along with on board signals such as AUX_OK and REG_PWR_OK, a number of simple functions can be implemented.

EN_REG_PWR: This signal is used to bootstrap the regulators to the ON state following the power on pulse interval. It will be active HI as long as REG_PWR_OK is HI, AUX_OK is HI, and the power on latch (PON) is HI. Loss of regulated voltage, AUX +5, or reset of the power latch will cause EN_REG_PWR to be LO, and the regulators will be turned off. This signal also drives the front panel RDY led thru OC driver U4 pin 8.

FLT LED: This signal drives the front panel FLT led thru U4 pin 10. It will be active HI whenever the power latch is reset (POFF=HI), or REG_PWR_OK is LO, and will momentarily be high on initial application of 24V to the pcb until AUX_OK comes high. This is to allow a visual check that the fault led is operational on a module insertion.

PWRON/!PWRON: These signals are the complementary outputs of the power latch defined by the CO state whenever there is a match on the A,B bus. AUX_OK forces the latch to the ON state on an insertion.

CM300 turns on with application of +24V to the board 11 during an insertion. As the aux circuits power on, AUX_OK is held LO until capacitor C6 can charge to the 2.5V_REF threshold. AUX_OK is used as a power on reset signal for the power latch in the control pal and also resets the pulsers U6. and U70.

C6. will charge to +5V thru R11, and crosses the 2.5VREF threshold in about 500 ms. The time is not critical, but it is desirable for the delay to be long enough to guarantee that all pcb fingers have made contact with the backplane connector pins upon insertion before turning on DC power to the disk drive.

When the threshold is reached, AUX_OK will go HI. This will fire the pulsers U70-13 (BSY PULSE), U70_5

(SCSI RST) and U6-13 (PPWR ON PULSE). PWR ON PULSE switches +24V into CM301 (+5VREG) and CM200 (+12VREG) through the power on switch driver U10-3, which goes low, turning on Q200.

As the regulated voltages turn on, they are monitored by U9, which produces the signal REG_PWR_OK. This signal will switch from lo to hi when both voltages are within +/−10% of their nominal values.

REG_PWR_OK is fed to the power control pal as described above, and is used to maintain the Q200 switch in the on state via EN_REG_PWR as long as REG_PWR_OK is HI at the end of the PWR_ON_PULSE interval (250 MSEC).

From that point on, Q200 will remain on as long as the regulated voltages stay within +/−10% (REG_PWR_OK= HI), and the power ctl latch remains set.

The monitor IC, U9, operates directly from the 24V input. Both +5VREG divider (R14/R15), and +12VREG divider (R16R17), are set such that the sense inputs to the monitor IC sits at 2.5V when the voltages are at nominal. The R20/R21 divider from the reference 2.5V output of the monitor IC sets the input at pin 4 to 1.0 volts. With this setting, the UV/OV set points are +/−10% of the nominal values for both the +5V and +12V regulators.

The embodiments of the present invention are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A drive regulator circuit board for use with a 3.50 disk drive, said drive regulator circuit board and said disk drive forming a disk drive module, said disk drive module being a part of an array of disk drive modules, said drive regulator circuit board comprising:

a) a regulator section for receiving +24 volts DC from a distributed raw DC power source, and producing therefrom +5V DC reg, +12V DC reg, a SCSI bus terminator voltage TERMS PWR and AUX OK for use in powering said 3.50 disk drive, said regulator section including a +12V regulator for producing the +12V DC reg, a +5V regulator for producing the +5V DC reg, a +5V AUX regulator for producing +5 V DC AUX DC, a power on delay circuit for receiving the +5V DC AUX and producing the AUX OK and a DC Power Enable switch for receiving the +24 V DC and outputting 24 V SW to the +12 volt regulator and the +5V regulator, b) means for monitoring the +5 V DC and +12V DC so produced, said means including a power supply supervisory circuit and a plurality of resistors and capacitors;

c) means for generating a SCSI bus reset pulse upon insertion or removal of the disk drive module, said means including a comparator, a pulser and a gate;

d) a first PAL for comparing the local address on the disk drive with an incoming address from one of two IOP controllers and a second PAL for turning the DC voltages on or off in response to certain prearranged commands from the controllers, said first PAL for comparing the local address and second PAL for turning the DC voltages on or off are each 22VIO PALS;

e) means for providing SCSI ID information for transmission to said 3.50 inch disk drive relative to other disk drive module locations in the array, said means comprising an ID bus and a drive unit; and f) a plurality of LED's and associated drivers for providing status and activity signals of the drive regulator circuit via a front panel display.

\* \* \* \* \*